(12) United States Patent
Singh et al.

(10) Patent No.: US 9,184,930 B2
(45) Date of Patent: Nov. 10, 2015

(54) DETECTION AND SUPPORT OF A DUAL-STACK CAPABLE HOST

(75) Inventors: Hemant Singh, Westford, MA (US); William Beebee, Acton, MA (US); Madhu Sudan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 12/480,623

(22) Filed: Jun. 8, 2009

(65) Prior Publication Data

US 2010/0309813 A1    Dec. 9, 2010

(51) Int. Cl.
*H04L 12/28* (2006.01)
*H04L 29/12* (2006.01)

(52) U.S. Cl.
CPC ........ *H04L 12/2801* (2013.01); *H04L 61/2015* (2013.01); *H04L 61/2076* (2013.01); *H04L 61/6086* (2013.01)

(58) Field of Classification Search
CPC .................................................. H04L 61/2015
USPC .......................................... 370/392; 709/245
See application file for complete search history.

(56) References Cited

U.S. PATENT DOCUMENTS

| 2002/0198881 | A1* | 12/2002 | Banerjee et al. ................ 707/10 |
| 2004/0184465 | A1* | 9/2004 | Lee et al. ...................... 370/400 |
| 2006/0159100 | A1* | 7/2006 | Droms et al. ............... 370/395.2 |
| 2008/0244102 | A1* | 10/2008 | Mochizuki ........................ 710/9 |
| 2009/0132696 | A1* | 5/2009 | Cankaya et al. ............... 709/224 |
| 2009/0210518 | A1* | 8/2009 | Verma et al. .................. 709/220 |
| 2009/0260083 | A1* | 10/2009 | Szeto et al. ..................... 726/22 |
| 2010/0332626 | A1* | 12/2010 | Jonsson et al. ................ 709/220 |

OTHER PUBLICATIONS

R. Woundy et al.; Dynamic Host Configuration Protocol (DHCP) Leasequery; Network Working Group Feb. 2006; RFC 4388; http://www.ietf.org/rfc/rfc4388.txt?number=4388; 26 Pages.
R. Droms et al.; Dynamic Host Configuration Protocol for IPv6 (DHVPv6); Network Working Group Jul. 2003; RFC 3315; http://www.ietf.org/rfc/rfc3315.txt?number=3315; 95 Pages.
T. Narten et al.; Neighbor Discovery for IP Version 6 (IPv6); Network Working Group Sep. 2007; RFC 4861; http://www.ietf.org/rfc/rfc4861.txt?number=4861; 91 Pages.

* cited by examiner

*Primary Examiner* — Nicholas Sloms
(74) *Attorney, Agent, or Firm* — Leon R. Turkevich (57) ABSTRACT

A network processing device is configured to receive a configuration message from a host device and forward the configuration message to a server. The configuration message can be configured to request the server assign an Internet Protocol (IP) address to the host device. The network processing device can be configured to send at least one probe message to the host device responsive to receiving the configuration message. The network processing device can be configured to determine whether the host device intends to continue utilizing a previously assigned IP address in addition to the IP address requested by the configuration message based, at least in part, on any responses to the at least one probe message received from the host device.

20 Claims, 11 Drawing Sheets

| HARDWARE TYPE | | 0x0800 | |
|---|---|---|---|
| HARDWARE SIZE | 4 | 1 | |
| CMTS HARDWARE ADDRESS ||||
| CMTS IPv4 ADDRESS ||||
| HOST HARDWARE ADDRESS ||||
| HOST IPv4 ADDRESS ||||

| 6 | FLOW LABEL | 0 | |
|---|---|---|---|
| 26 + LENGTH OF LLA | | 0x3a | 255 |
| CMTS IPv6 ADDRESS ||||
| HOST IPv6 ADDRESS ||||
| 135 | 0 | ICMPv6 CHECKSUM ||
| RESERVED = 0 ||||
| HOST IPv6 ADDRESS ||||
| 1 | 1 | CMTS LINK LAYER ADDRESS ||
| CMTS LINK LAYER ADDRESS cont... ||||

US 9,184,930 B2

DETECTION AND SUPPORT OF A DUAL-STACK CAPABLE HOST

FIELD OF THE INVENTION

This invention relates generally to network communications.

BACKGROUND

Many communication networks include intermediate networking devices, such as access concentrators described in RFC 4388, to forward network traffic to and from host devices based on their assigned Internet Protocol (IP) addresses. The ability of these intermediate networking devices to identify and accurately associate IP addresses to host devices allows for effective routing of network traffic and also provides security in the communication networks.

As the networking community transitions from Internet Protocol, version 4 (IPv4) to version 6 (IPv6), many host devices are starting to include operating systems that enable the use of both Internet Protocol versions. For instance, when these host devices are assigned an IP address for one of the two versions, i.e., either IPv4 or IPv6, they are in a single-stack configuration. When the host devices are assigned IP addresses for both versions, i.e., both IPv4 and IPv6, they are in a dual-stack configuration. The introduction of host devices capable of dual-stack configuration to the communication networks, however, renders it difficult for the intermediate networking devices to detect whether the host devices are in a dual-stack configuration and thus to properly associate the corresponding IP addresses to the host devices.

DETAILED DESCRIPTION

Overview

In network communications, many host devices are becoming capable of operating in a dual-stack mode, i.e., utilizing both an Internet Protocol-version 4 (IPv4) address and an Internet Protocol-version 6 (IPv6) address. These IP addresses can be assigned by a dynamic host configuration protocol (DHCP) server through the exchange of configuration messaging with the host devices.

Many networks include an access concentrator, such as a cable modem termination system (CMTS), to route traffic to and from the host devices based on their assigned IP address (es). The access concentrator can detect when a DHCP server assigns an IP address to the host device by snooping configuration messaging exchanged between the host devices and DHCP server. When a host device requests to be assigned a different IP address version, the access concentrator can send probes directly to the host device to determine whether the host device intends to continue utilizing a previously assigned IP address in addition to the different IP address version requested by the configuration messaging.

DESCRIPTION

Figure 1:
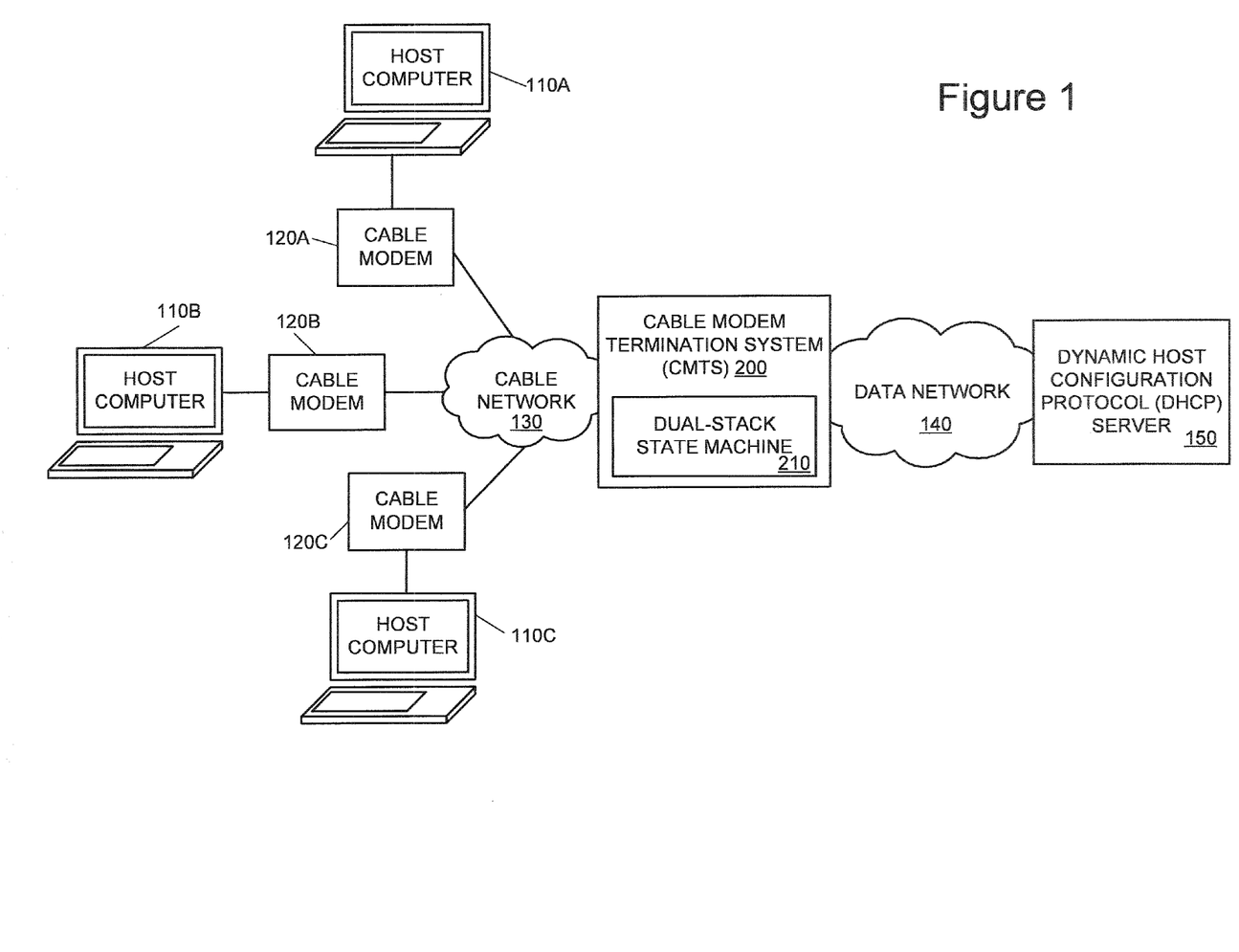
FIG. 1 illustrates an example networking system that includes a cable modem termination system for supporting dual-stack capable host devices.

FIG. 1 illustrates an example networking system that includes a cable modem termination system 200 for supporting dual-stack capable host devices 110A-110C. Referring to FIG. 1, the networking system can include multiple host devices 110A-110C that are capable of dual-stack operation, i.e., that can be concurrently assigned both of an Internet Protocol-version 4 (IPv4) address and at least one Internet Protocol-version 6 (IPv6) address. These dual-stack capable host devices 110A-110C can be communicatively coupled with corresponding cable modems 120A-120C, allowing the host devices 110A-110C to communicate over a cable network 130. The host devices 110A-110C can be personal computers (PC), workstations, or any other device or computing system that can send or receive data over the cable network 130 via the cable modems 120A-120C.

The networking system includes a cable modem termination system (CMTS) 200 that can operate as an access concatenator for traffic passed over the cable network 130 by the cable modems 120A-120C, i.e., the CMTS 200 can collect traffic from multiple host devices 110A-110C over the cable network 130 and forward the traffic over a data network 140. The data network 140 can be a packet-switched network, circuit-switched network, or a combination of one or more packet-switched networks and one or more circuit-switched networks. Although FIG. 1 shows at least a portion of a networking system implementing a cable network, e.g., the CMTS 200, the cable network 130, and cable modems 120A-120C, in some embodiments, the host devices 110A-110C can communicate over a data network 140 through various other networks, such as a digital subscriber line (DSL) network including a digital subscriber line access multiplexer (DSLAM), a cellular broadband network with a cellular broadband concentrator, etc.

The host devices 110A-110C can be assigned IPv4 addresses or IPv6 addresses through an exchange of configuration messaging with a dynamic host configuration protocol (DHCP) server 150. The CMTS 200 can snoop the configuration messaging and record the IP addresses that the DHCP server 150 has assigned to the host devices 110A-110C for use when routing network traffic to and from the host devices 110A-110C. Embodiments of the configuration messaging for the assignment of both IPv4 addresses and IPv6 addresses will be discussed below in greater detail.

The CMTS 200 includes a dual-stack state machine 210 to identify an operational state for the host devices 110A-110C, for example, a no address state, a single-stack state, or a dual-stack state. The no address state can occur when a host device is not currently assigned or enabled to utilize any IP addresses. The single-stack state can occur when a host device is assigned and enabled to utilize either an IPv4 address or one or more IPv6 addresses. The dual-stack state can occur when the host device is assigned and enabled to utilize both IPv4 and IPv6 addresses.

To detect the operational modes of the host devices 110A-110C, the CMTS 200 can snoop configuration messaging between the host devices 110A-110C and the DHCP server 150 to determine when a new IP address is assigned to any of the host devices 110A-110C. To determine when the host devices 110A-110C no longer wish to utilize an assigned IP address, the CMTS 200 can snoop DHCP RELEASE messaging that requests the assignment of the IP address to a particular host device be removed.

Since the host device 110 may or may not send DHCP RELEASE messaging to remove the assignment of an IP address, for example, when the host device 110 allows the IP address to time out without renewal, the CMTS 200 is configured to send at least one probe message that can be used to determine whether a host device 110 intends to utilize a newly assigned IP address in addition to a previously assigned IP address, i.e., operate in a dual-stack mode, or whether the host device 110 intends to operate in a single-stack mode only utilizing the newly assigned IP address. In some embodiments, the probe messages can be addressed to the previously assigned IP address, and the determination of operational mode can be made based on a reception of a response to the probe. Embodiments of the detection of an operational state of the host devices 110A-110C will be discussed below in greater detail.

Figure 2:
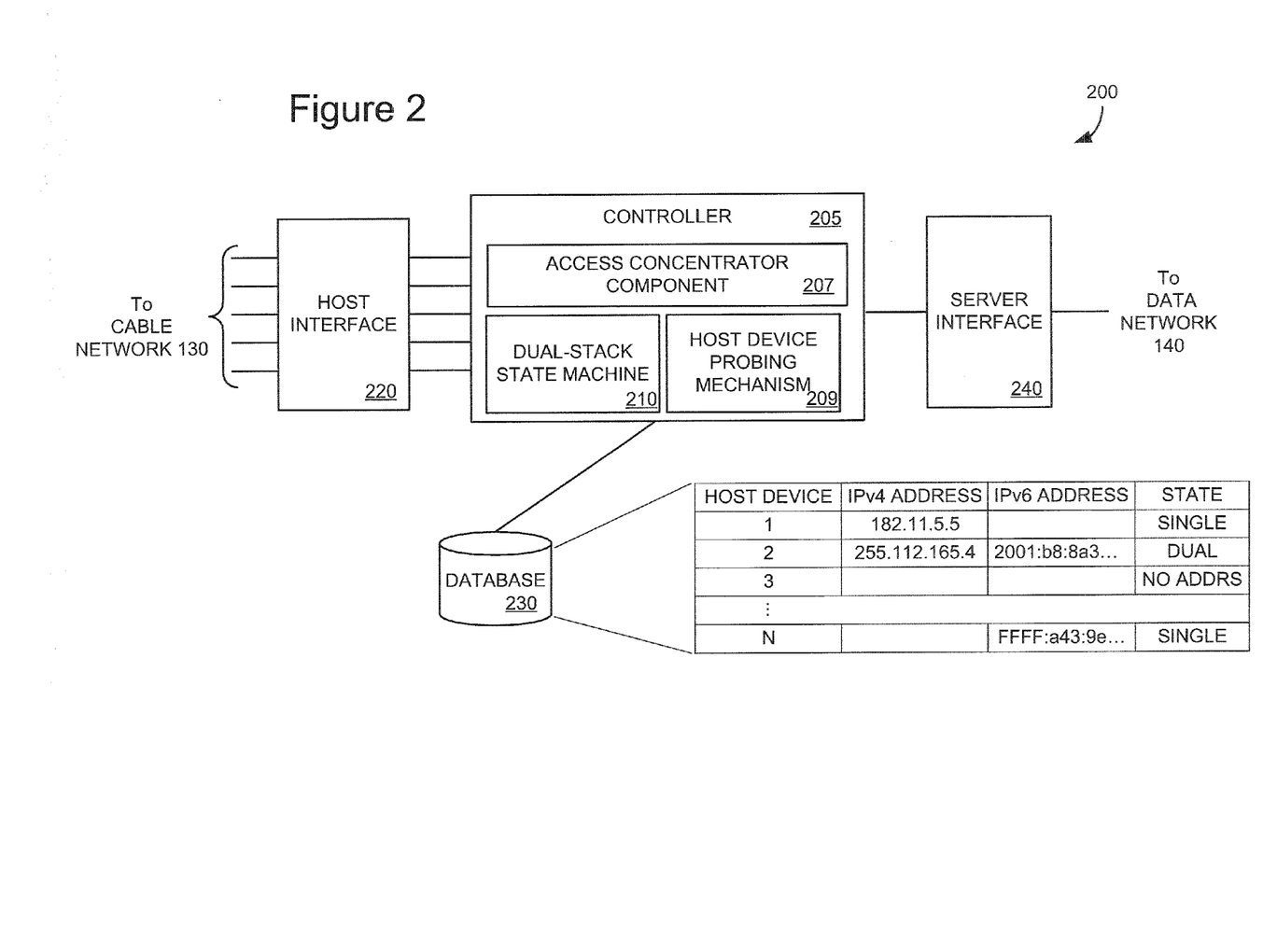
FIG. 2 illustrates an example embodiment of the cable modem termination system shown in FIG. 1.

FIG. 2 illustrates an example embodiment of the cable modem termination system 200 shown in FIG. 1. Referring to FIG. 2, the CMTS 200 includes a host interface 220 to exchange traffic over the cable network 130, and includes a server interface 240 to exchange traffic over the data network 140. The CMTS 200 includes a controller 205 that can route network traffic between the host and server interfaces 220 and 240. The controller 205 can be a computing system or processing system which can include one or more processors or other controlling devices, and in some embodiments, can be implemented in firmware or as a discrete set of hardware elements. The controller 205 can be coupled to a computer or machine readable storage medium or other memory device that includes instructions, when executed by the controller 205, can cause the controller 205 to perform various functions or operations as disclosed herein.

The controller 205 includes an access concentrator component 207 to collect or multiplex traffic from the cable network 130 for transmission over the data network 140 via the server interface 240. The access concentrator component 207 can also receive traffic from the data network 140 and route the traffic to the proper host device 110A-110C over the cable network 130.

The controller 205 includes the dual-stack state machine 210 to detect and maintain the operational states of the host devices 110A-110C. As discussed above in FIG. 1, the CMTS 200 can detect the operational state of dual-stack capable host devices 110A-110C by snooping configuration messaging between the host devices 110A-110C and the DHCP server 150 in combination with sending at least one probe message directly to the host devices 110A-110C when the host device has a previously assigned IP address.

The controller 205 can include a host device probing mechanism 209 to generate and send at least one probe message to a host device when that host device initiates the configuration messaging. In some embodiments, the dual-stack state machine 210 initiates the host device probing mechanism 209 to generate the probes when the host device currently has an assigned IP address. Embodiments of the probes messages and dataflow through the CMTS 200 will be described below in greater detail.

The CMTS 200 includes a database 230 to store operational state information of the host devices 110A-110C for the controller 205. The database 230 can be any memory or data storage device capable of interacting with and storing data for the controller 205. In some embodiments, the database 230 can store data corresponding to the state of the host devices 110A-110C. For example, the database 230 can include a table that correlates the host devices with the IPv4 and IPv6 addresses that they have been assigned by the DHCP server 150. The database 230 can also store a current operational state of the host devices 110A-110C. In some embodiments, the host devices 110A-110C can be identified according to a link-local address that the host devices 110A-110C can utilize to communicate with the CMTS 200 over the cable network 130.

Figure 3:
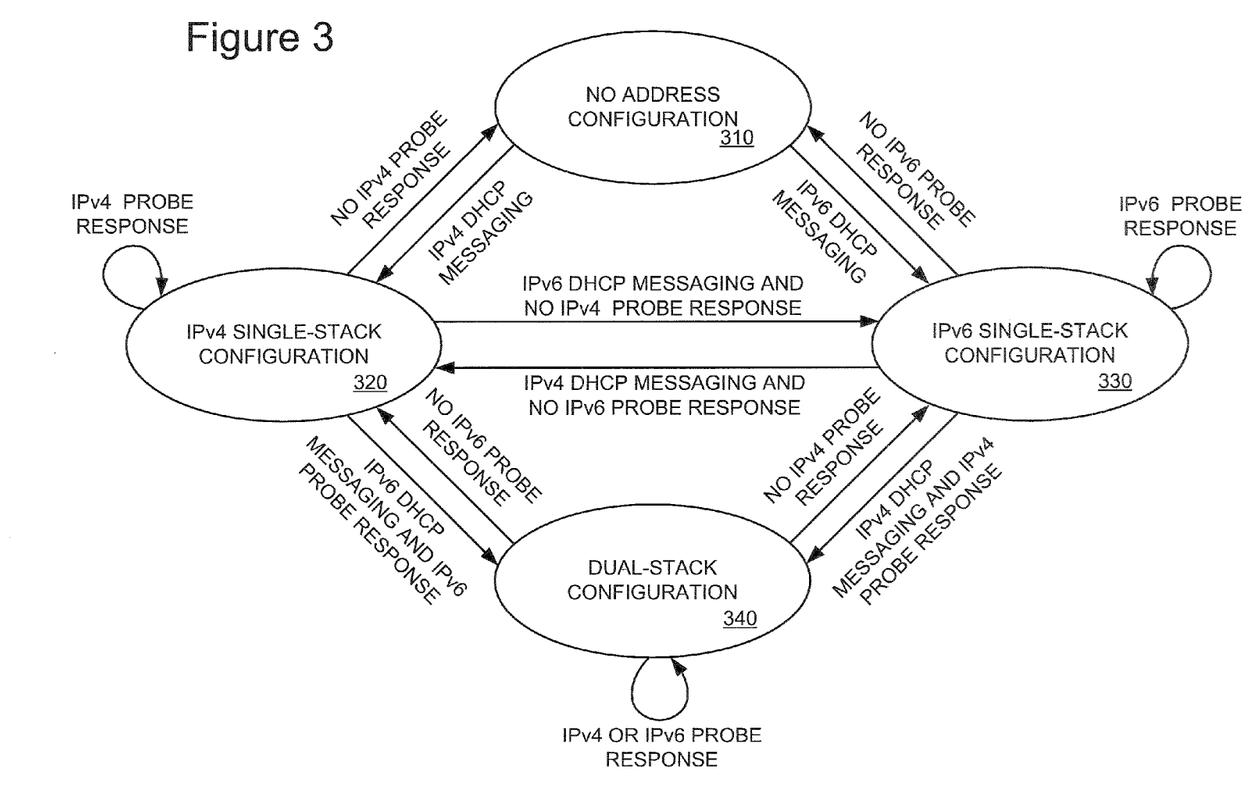
FIG. 3 shows an example state diagram of various operational embodiments of host devices as detected by the cable modem termination system.

FIG. 3 shows an example state diagram of various operational embodiments of host devices 110A-110C as detected by the cable modem termination system 200. Referring to FIG. 3, the CMTS 200 includes a dual-stack state machine 210 that detects and maintains an operational state for each host device that it communicates with over the cable network 130. This example state diagram includes four states: a no address configuration 310, an IPv4 single-stack configuration 320, an IPv6 single-stack configuration 330, and a dual-stack configuration 340.

In the no address configuration 310, the host device has not been assigned an IP address by the DHCP server 150. The host device will remain in the no address configuration 310 until the host device initiates configuration messaging to have a DHCP server 150 assign an IP address to the host device. For instance, the host device can request an IPv4 address with IPv4 DHCP messaging, or request an IPv6 address with IPv6 DHCP messaging. The CMTS 200 can detect when the DHCP server 150 assigns an IP address to the host device, e.g., by snooping the configuration messaging while being routed to the host device, and record a new state for the host device based on the assignment.

In the IPv4 single-stack configuration 320, the host device has been assigned an IPv4 address by the DHCP server 150. The host device can change states by requesting assignment of an IPv6 address from the DHCP server 150. In response to the assignment request, the CMTS 200 will generate at least one probe message to send to the host device to determine whether the host device is still utilizing the IPv4 address. In some embodiments, the at least one probe message can be up to 5 unicast Address Resolution Protocol (ARP) messages that are serially sent to the host device from the CMTS 200. At least one Internet Control Message Protocol-version 4 (ICMPv4) echo message can be used as the at least one probe message instead of ARP message(s). These ICMPv4 echo messages can support multiple routed hops between the dual-stack state machine 210 and the host devices 110A-110C, for example, when one or more intermediate and/or end devices are not set to filter the ICMPv4 echo messages.

When the CMTS 200 determines the host device is still utilizing the IPv4 address, e.g., based on an ARP response to the probe messages from the host device, the CMTS 200 can change state to a dual-stack configuration 340, if the DHCP server 150 assigns the host device an IPv6 address. In some embodiments, the CMTS 200 can detect whether the DHCP 200 assigns an IPv6 address to the host device by snooping configuration messaging from the DHCP server 150. If the DHCP server 150 does not assign the host device an IPv6 address, the CMTS 200 has determined that the host device has not changed its state.

When the CMTS 200 determines the host device is no longer utilizing the IPv4 address, e.g., based on not receiving the ARP response from the host device, the CMTS 200 will change state to a no address configuration 310 or an IPv6 single-stack configuration 330 based on whether the DHCP 200 assigns an IPv6 address to the host device.

In the IPv6 single-stack configuration 330, the host device has been assigned an IPv6 address by the DHCP server 150. The host device can change states by requesting assignment of an IPv4 address from the DHCP server 150. In response to the assignment request, the CMTS 200 will generate at least one probe message to send to the host device to determine whether the host device is still utilizing the IPv6 address. In some embodiments, the at least one probe message can be up to 3 unicast Neighbor Solicitation (NS) messages that are serially sent to the host device from the CMTS 200, for example, in accordance with RFC 4861. At least one Internet Control Message Protocol-version 6 (ICMPv6) Echo Request message can be used as the at least one probe message instead of NS message(s). These ICMPv6 Echo Request messages can support multiple routed hops between the dual-stack state machine 210 and the host devices 110A-110C, for example, when one or more intermediate and/or end devices do not filter the ICMPv6 Echo Request messages.

When the CMTS 200 determines the host device is still utilizing the IPv6 address, e.g., based on a Neighbor Advertisement (NA) response to the probe messages from the host device, the CMTS 200 can change state to a dual-stack configuration 340, if the DHCP server 150 assigns the host device an IPv4 address. In some embodiments, the CMTS 200 can detect whether the DHCP 200 assigns an IPv4 address to the host device by snooping configuration messaging from the DHCP server 150. If the DHCP server 150 does not assign the host device an IPv4 address, the CMTS 200 has determined that the host device has not changed its state.

When the CMTS 200 determines the host device is no longer utilizing the IPv4 address, e.g., based on not receiving an NA response from the host device, the CMTS 200 will change state to a no address configuration 310 or an IPv4 single-stack configuration 320 based on whether the DHCP 200 assigns an IPv4 address to the host device.

In the dual-stack configuration 340, the host device has been assigned both an IPv4 and an IPv6 address by the DHCP server 150. The host device can change states by requesting assignment of either an IPv4 or IPv6 address from the DHCP server 150. In response to the assignment request, the CMTS 200 will generate at least one probe message to send to the host device to determine whether the host device is still utilizing the type of IP address that the host device did not request from the DHCP server 150. For instance, when the host device requests assignment of an IPv4 address, the CMTS 200 will send IPv6 probes to the host device to determine whether the host device is still utilizing the previously assigned IPv6 address. Conversely, when the host device requests assignment of an IPv6 address, the CMTS 200 will send IPv4 probes to the host device to determine whether the host device is still utilizing the previously assigned IPv4 address. If the CMTS 200 does not receive a response to the probes that it sends to the host device, then the CMTS 200 has detected the host device is no longer using a previously assigned IP address and has changed from the dual-stack configuration 340 to one of the single-stack configurations 320 or 330.

In some embodiments, the state machine can have additional intermediate states between states 310-340. For instance, Table 1 shows a representation of tracking a state of host devices in a CMTS 200 with several intermediate states between states 310-340.

TABLE 1

| CURRENT STATE | EVENT | ACTION | NEW STATE |
|---|---|---|---|
| NO_ADDRESS | Receive DHCPACK. | IPv4 addrs in use. | IPV4_ONLINE |
| NO_ADDRESS | Receive REPLY but LLA not detected. | Drop message. | NO_ADDRESS |
| NO_ADDRESS | Receive REPLY and LLA detected. | IPv6 addrs in use. | IPV6_ONLINE |
| IPV4_ONLINE | Receive SOLICIT. | Start probe for IPv4. | PROBING_IPV4_SS |
| PROBING_IPV4_SS | Receive REPLY. | — | PROBING_IPV4_RCV_REPLY |
| PROBING_IPV4_RCV_REPLY | Receive probe response. | IPv6 addrs in use. | DUAL_ONLINE |
| PROBING_IPV4_SS | Receive probe response. | — | RCV_PROBEV4_RESP |
| RCV_PROBEV4_RESP | Receive REPLY. | IPv4 and IPv6 addrs in use. | DUAL_ONLINE |
| IPV6_ONLINE | Receive DHCPDISCOVER. | Start probe for IPV6. | PROBING_IPV6_SS |
| PROBING_IPV6_SS | Receive probe response. | — | RCV_PROBEV6_RESP |
| RCV_PROBEV6_RESP | Receive DHCPACK. | IPv4 addrs in use. | DUAL_ONLINE |
| PROBING_IPV6_SS | Receive DHCPACK. | — | PROBING_IPV6_RCV_DHCPACK |
| PROBING_IPV6_RCV_DHCPACK | Receive probe response. | IPv4 addrs in use. | DUAL_ONLINE |
| PROBING_IPV4_SS | Probe times out. | IPv4 addrs not in use. | WAITING_FOR_REPLY_SS |
| WAITING_FOR_REPLY_SS | Receive REPLY and LLA detected. | IPV6 addrs in use. | IPV6_ONLINE |
| WAITING_FOR_REPLY_SS | Receive REPLY but LLA not detected. | Drop message. | WAITING_FOR_REPLY_SS |
| PROBING_IPV6_SS | Probe times out. | IPv6 addrs not in use. | WAITING_FOR_DHCPACK_SS |
| WAITING_FOR_DHCPACK_SS | Receive DHCPACK. | IPv4 addrs in use. | IPV4_ONLINE |
| DUAL_ONLINE | Receive DHCPDISCOVER. | Start probe for IPv6. | PROBING_IPV6_DS |
| PROBING_IPV6_DS | Probe times out. | IPv6 addrs not in use. | WAITING_FOR_DHCPACK_DS |
| WAITING_FOR_DHCPACK_DS | Receive DHCPACK. | IPv4 addrs changed. | IPV4_ONLINE |
| DUAL_ONLINE | Receive SOLICIT. | Start probe for IPv4. | PROBING_IPV4_DS |
| PROBING_IPV4_DS | Probe times out. | IPv4 addrs not in use. | WAITING_FOR_REPLY_DS |
| WAITING_FOR_REPLY_DS | Receive REPLY and LLA detected. | IPV6 addrs changed. | IPV6_ONLINE |
| WAITING_FOR_REPLY_DS | Receive REPLY but LLA not detected. | Drop message. | WAITING_FOR_REPLY_DS |

In Table 1, the additional states clarify whether the host device is possibly transitioning from a single-stack (SS) configuration or from a dual-stack (DS) configuration. The additional states also indicate which action or event the CMTS 200 is waiting for, i.e., waiting for a probe reply, waiting for a message from the DHCP server 150 with the assignment of the new IP address.

Figure 4A:
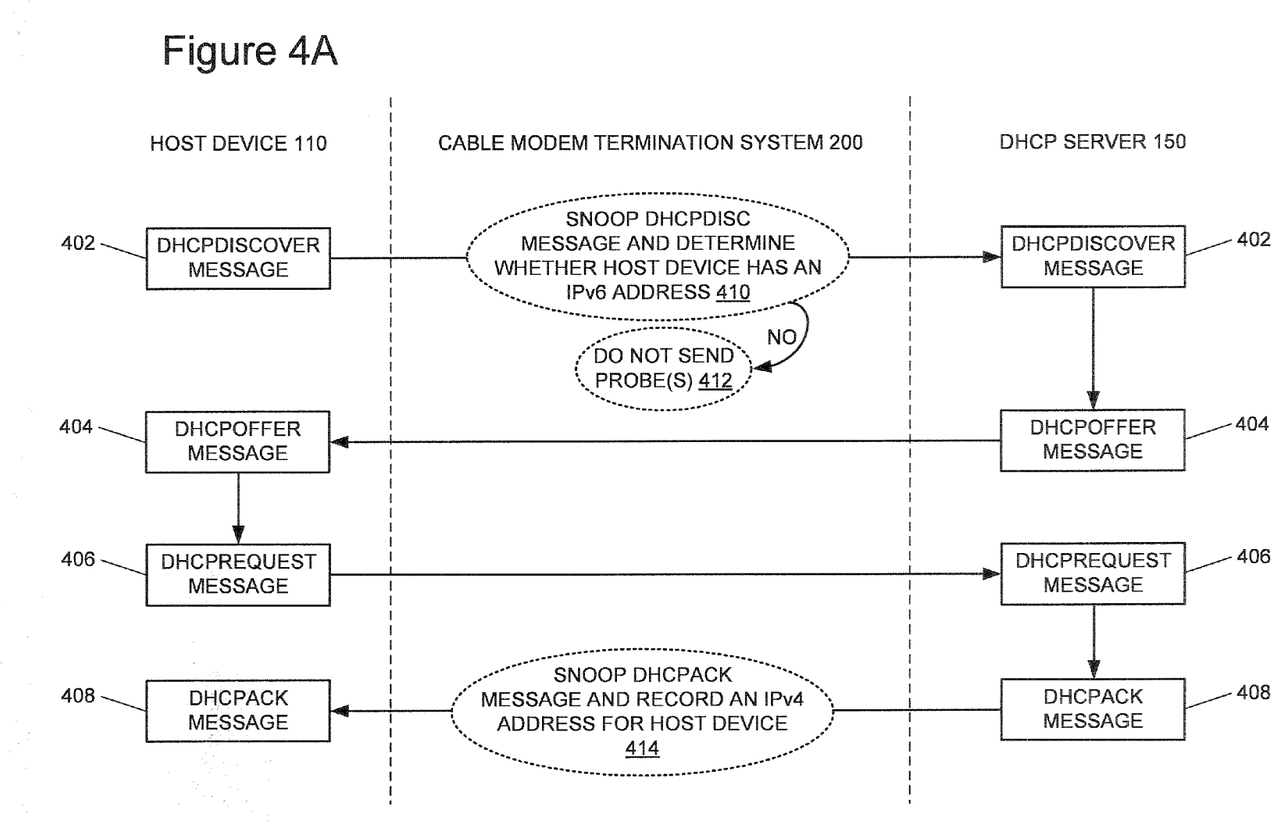
FIGS. 4A-4C show example flowcharts for operational embodiments of the networking system shown in FIG. 1.
Figure 4B:
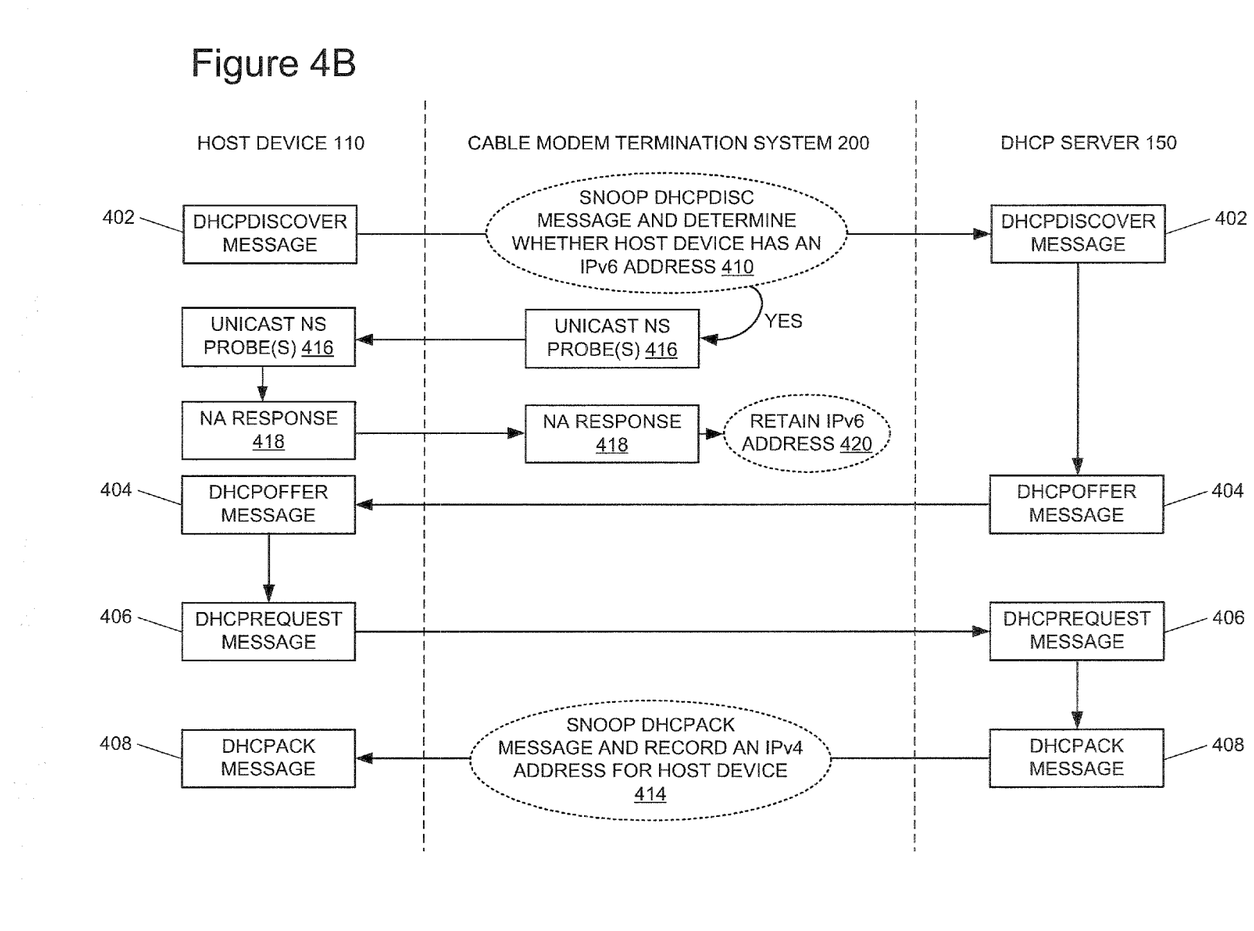
Figure 4C:
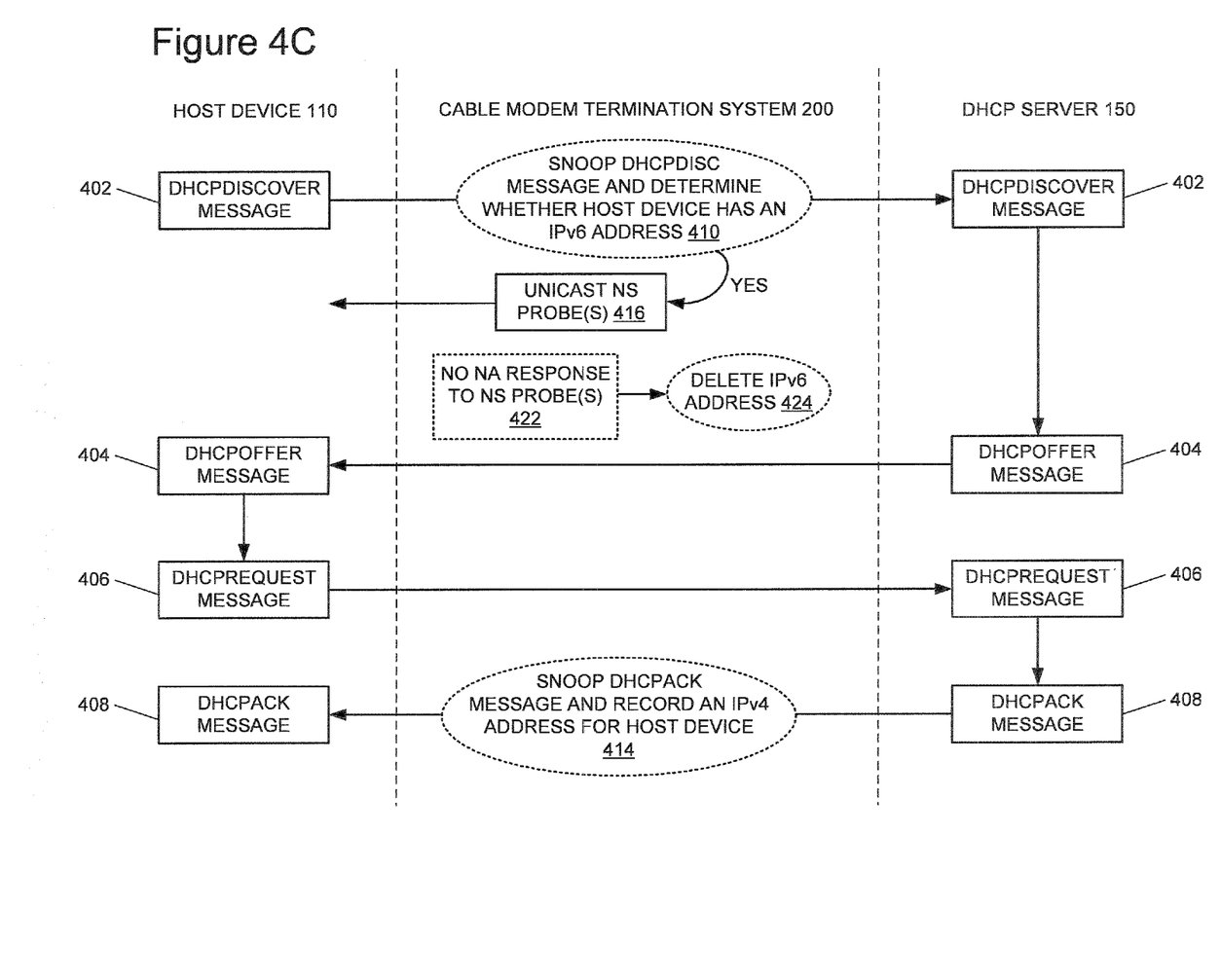

FIGS. 4A-4C show example flowcharts for operational embodiments of the networking system shown in FIG. 1. Referring to FIG. 4A, this example flowchart shows a more detailed exchange of configuration messaging through the CMTS 200 when the host device 110 is requesting assignment of an IPv4 address from the DHCP server 150.

The host device 110 initiates the configuration messaging by broadcasting a DHCPDISCOVER message 402 through the CMTS 200 over the data network 140 to the DHCP server 150. The broadcast of the DHCPDISCOVER message 402 is an attempt by the host device 110 to locate a DHCP server 150 that is available to assign IPv4 addresses. In a block 410, the CMTS 200 can snoop the DHCPDISCOVER message 402 to realize that the host device 110 is initiating the process of IPv4 address assignment. The CMTS 200 can perform an internal look-up to determine whether the host device 110 is currently assigned an IPv6 address. In block 412 of FIG. 4A, the CMTS 200 determines that the host device 110 was not currently assigned an IPv6 address, and therefore the CMTS 200 decides to not send at least one probe to the host device 110.

The DHCP server 150 can respond to the DHCPDISCOVER message 402 with a DHCPOFFER message 404, indicating that the DHCP server 150 is available to provide network parameters and assign IPv4 addresses. After receipt of the DHCPOFFER message 404, the host device 110 can then request assignment of an IPv4 address from the DHCP server 150, for example, by sending a DHCPREQUEST message 406 to DHCP server 150 through the CMTS 200. The DHCP server 150 can then respond to the DHCPREQUEST message 406 with a DHCPACK message 408 that includes the IPv4 address assigned to the host device 110. In a block 414, the CMTS 200 snoops the DHICPACK message 408 to ascertain the IPv4 address assigned to the host device 110, and record the IPv4, e.g., in the database 230, to be correlated with the host device 110.

Referring to FIGS. 4B and 4C, these example flowcharts are similar to FIG. 4A, except the CMTS 200 determines, in block 410, that the host device 110 did have a previously assigned IPv6 address. In response to determining the host device 110 did have a previously assigned IPv6 address, the CMTS 200 generates unicast Neighbor Solicitation (NS) probes 416 to be sent to the host device 110. In some embodiments, the CMTS 200 can send up to 3 NS probes 416 to the host device 110. As discussed above, one or more ICMPv6 Echo Request messages can be sent as the probe messages instead of the NS messages.

In FIG. 4B, the host device 110 receives one or more of the NS probes 416 and responds to the NS probe 416 with a Neighbor Advertisement (NA) response 418. The NA response 418 is sent to the CMTS 200 over the cable network 130. The CMTS 200, upon receipt of the NA response 418 from the host device 110, recognizes that the host device 110 is still utilizing the previously assigned IPv6 address, and therefore, in block 420, retains that IPv6 address and the correlation to the host device 110 in the database 230.

In FIG. 4C, the host device 110 fails to respond to the NS probe 416 with an appropriate NA response 418 in a timely fashion. After a predetermined period of time without receiving the NA response 418 from the host device 110, the CMTS 200 determines that the host device 110 is not utilizing the previously assigned IPv6 address in block 422, and therefore, in block 424, deletes that IPv6 address and the correlation to the host device 110 from the database 230. The CMTS 200 utilizes this information to cease forwarding or routing network traffic to the host device 110 when addressed to the deleted IPv6 address.

Figure 5A:
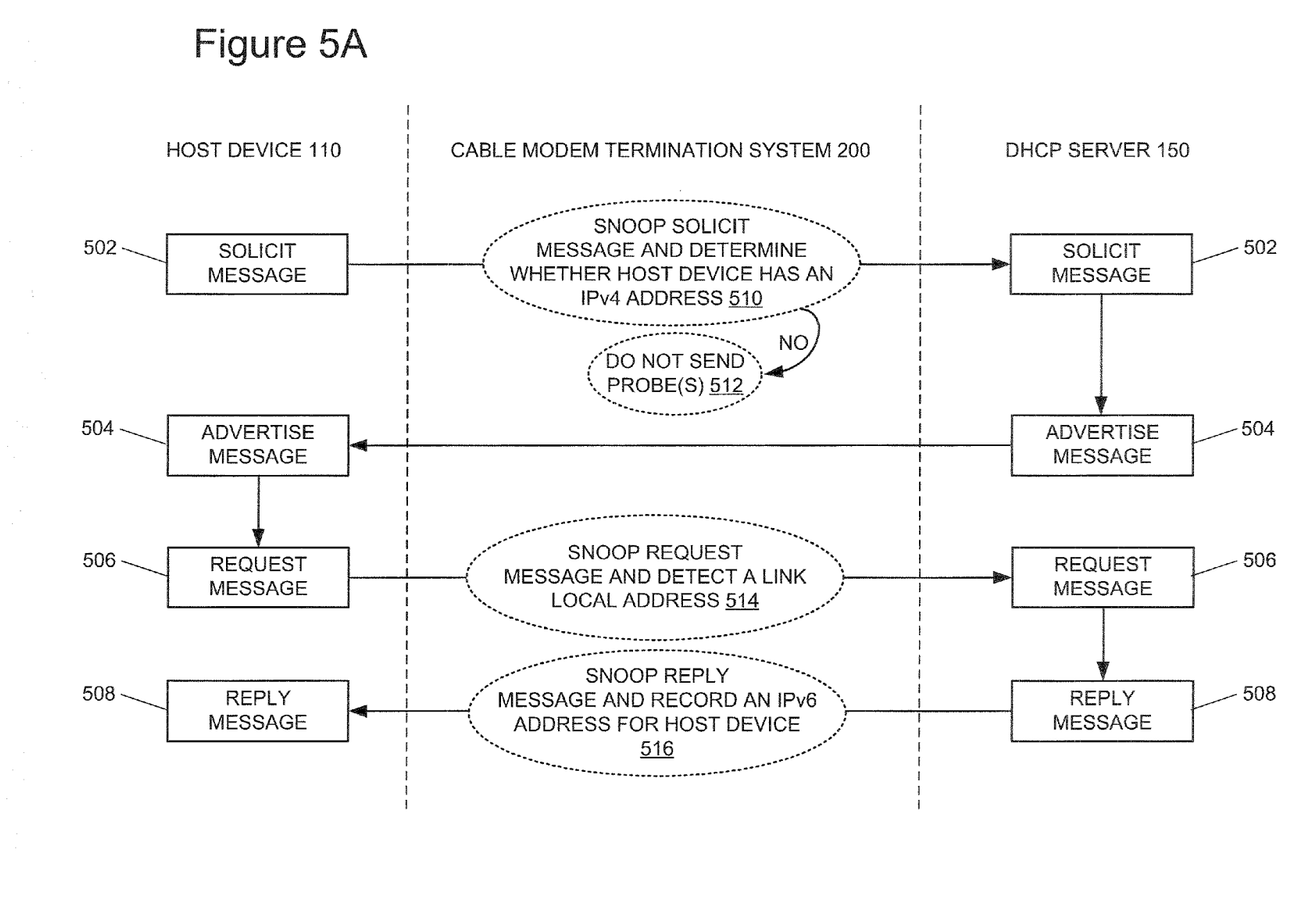
FIGS. 5A-5C show example flowcharts for operational embodiments of the networking system shown in FIG. 1.
Figure 5B:
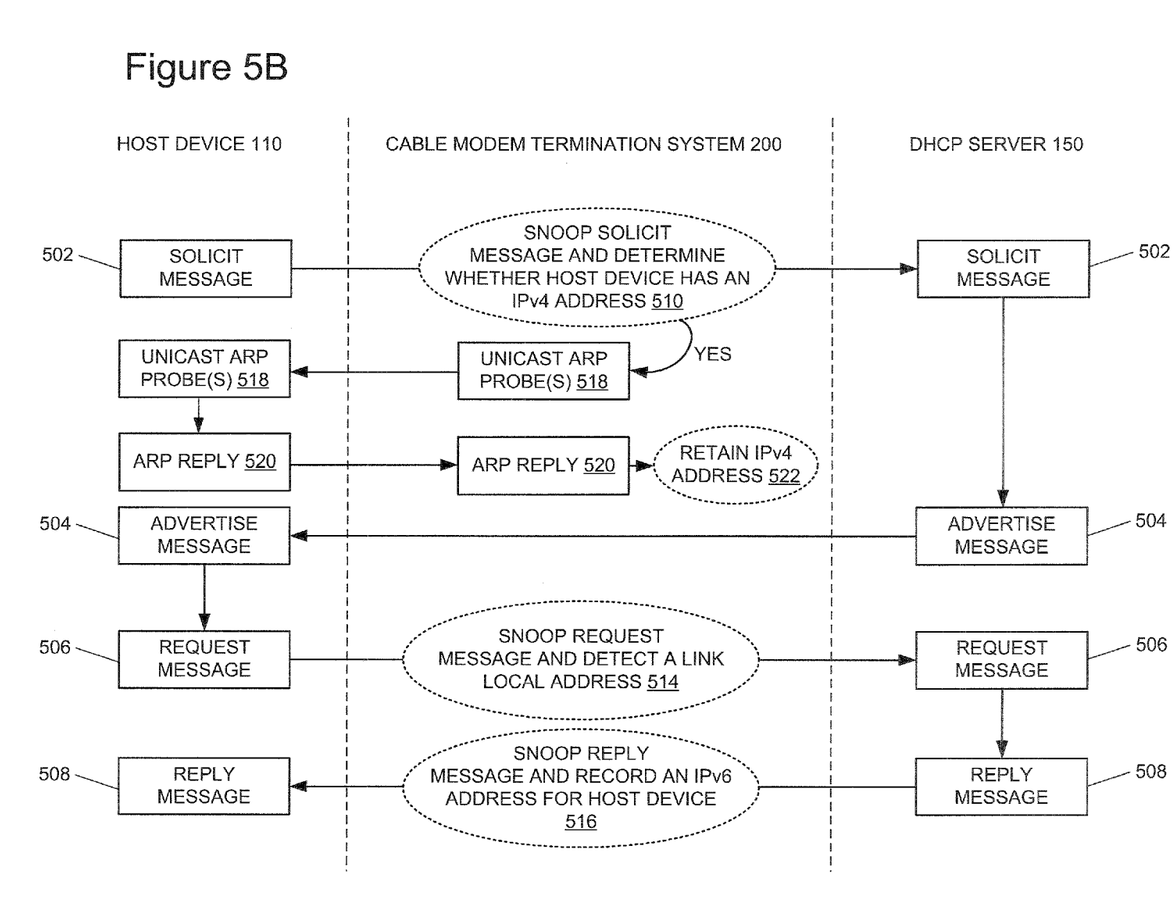
Figure 5C:
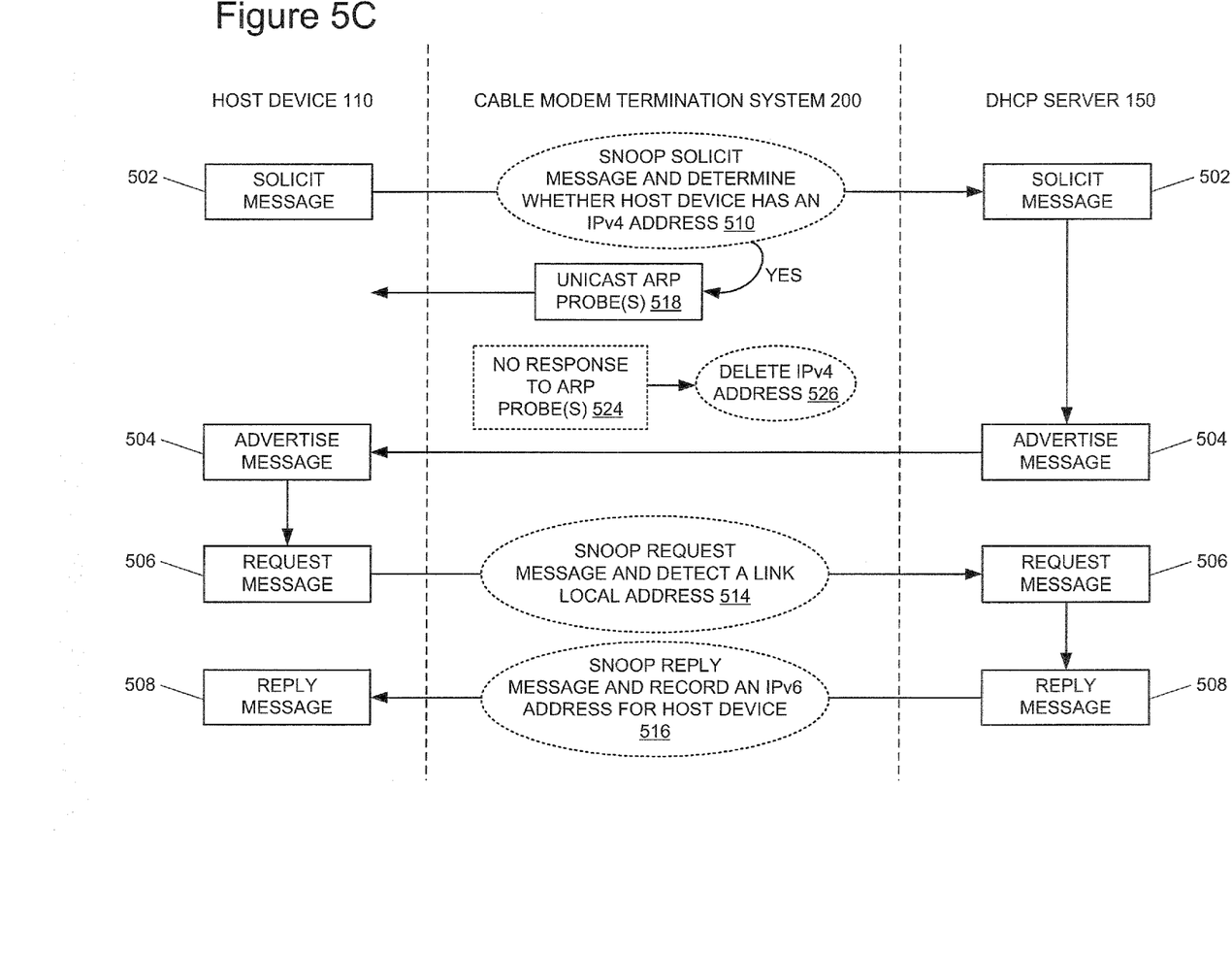

FIGS. 5A-5C show example flowcharts for operational embodiments of the networking system shown in FIG. 1. Referring to FIG. 5A, this example flowchart shows a more detailed exchange of configuration messaging through the CMTS 200 when the host device 110 is requesting assignment of an IPv6 address from the DHCP server 150.

The host device 110 initiates the configuration messaging by multicasting a DHCPv6 SOLICIT message 502 through the CMTS 200 over the data network 140 to the DHCP server 150. The multicast of the SOLICIT message 502 is an attempt by the host device 110 to locate a DHCP server 150 that is available to assign IPv6 addresses. In a block 510, the CMTS 200 can snoop the SOLICIT message 502 to determine that the host device 110 is initiating the process of IPv6 address assignment. The CMTS 200 can perform an internal look-up to determine whether the host device 110 is currently assigned an IPv4 address. In block 512 of FIG. 5A, the CMTS 200 determines that the host device 110 was not currently assigned an IPv4 address, and therefore the CMTS 200 decides to not send at least one probe to the host device 110.

The DHCP server 150 can respond to the SOLICIT message 502 with a ADVERTISE message 504, indicating that the DHCP server 150 is available to provide network parameters and assign IPv6 addresses. After receipt of the ADVERTISE message 504, the host device 110 can then request assignment of an IPv6 address from the DHCP server 150, for example, by sending a REQUEST message 506 to DHCP server 150 through the CMTS 200. The CMTS 200, in block 514, can snoop the REQUEST message 506 to detect a link local address in the REQUEST message 506.

The DHCP server 150 can respond to the REQUEST message 506 with a REPLY message 508 that includes the IPv6 address assigned to the host device 110. In a block 516, the CMTS 200 snoops the REPLY message 508 to ascertain the IPv6 address assigned to the host device 110, and record the IPv6, e.g., in the database 230, to be correlated with the host device 110. If a DHCPv6 server is configured for Rapid Commit, for example, as described in RFC 3315, then the DHCPv6 server and the host device can exchange SOLICIT and REPLY messages. The probing mechanism also applies to such a two-way DHCPv6 exchange as well as the 4-way commit described above.

Referring to FIGS. 5B and 5C, these example flowcharts are similar to FIG. 5A, except the CMTS 200 determines, in block 510, that the host device 110 had a previously assigned IPv4 address. In response to determining the host device 110 did have a previously assigned IPv4 address, the CMTS 200 generates unicast Address Resolution Protocol (ARP) probes 518 to be sent to the host device 110. In some embodiments, the CMTS 200 can send up to 5 ARP probes 518 to the host device 110. As discussed above, one or more ICMPv4 echo messages can be sent as probe messages instead of the ARP messages.

In FIG. 5B, the host device 110 receives one or more of the ARP probes 518 and responds to the ARP probe 518 with an ARP response 520. The ARP response 520 is sent to the CMTS 200 over the cable network 130. The CMTS 200, upon receipt of the ARP response 520 from the host device 110, recognizes that the host device 110 is still utilizing the previously assigned IPv4 address, and therefore, in block 522, retains that IPv4 address and the correlation to the host device 110 in the database 230.

In FIG. 5C, the host device 110 fails to respond to the unicast ARP probe 518 with an appropriate ARP response 520 in a timely fashion. After a predetermined period of time without receiving the ARP response 520 from the host device 110, the CMTS 200 determines that the host device 110 is not utilizing the previously assigned IPv4 address in block 524, and therefore, in block 526, deletes that IPv4 and the correlation to the host device 110 from the database 230. The CMTS 200 utilizes this information to cease forwarding or routing network traffic to the host device 110 when addressed to the deleted IPv4 address.

Figure 6A:
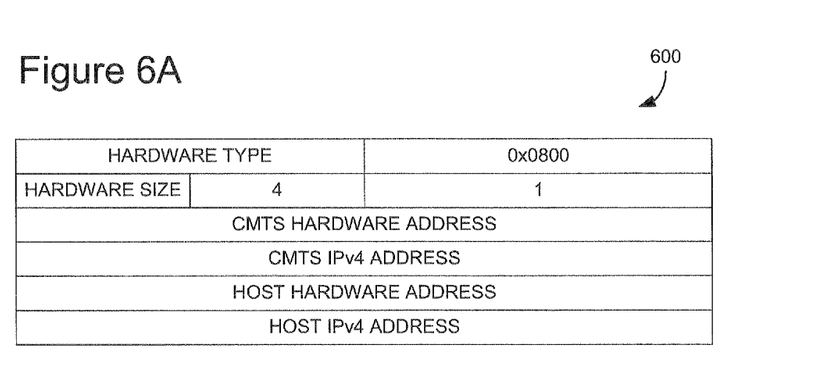
FIGS. 6A and 6B show example configurations of probe messages sent by the cable modem termination system.
Figure 6B:
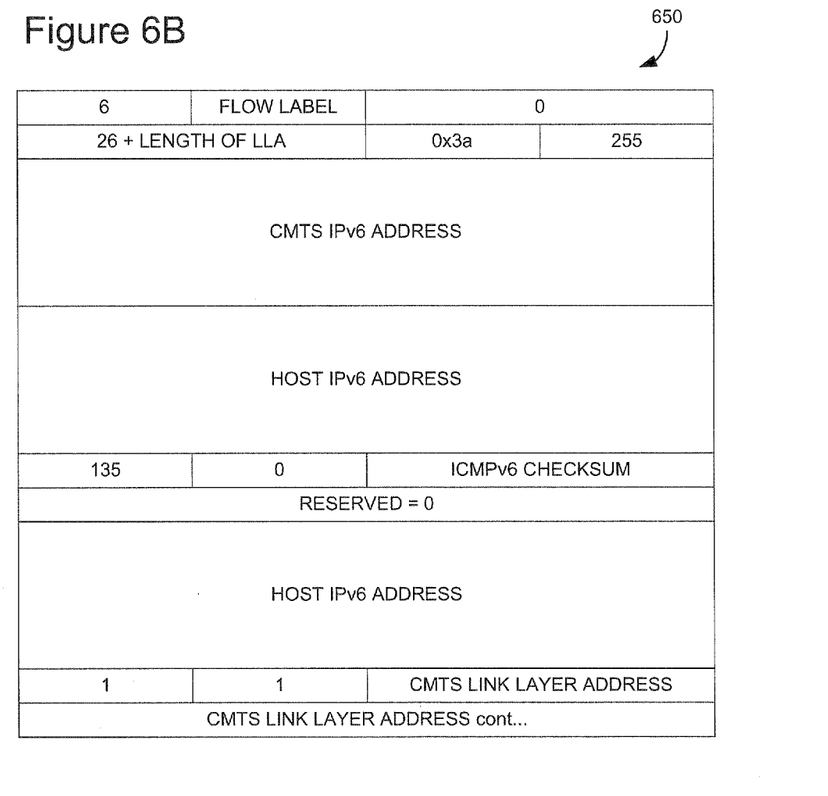

FIGS. 6A and 6B show example configurations of probe messages sent by the cable modem termination system 200. Referring to FIGS. 6A and 6B, the probe message 600 is an example Address Resolution Protocol (ARP) probe message sent to the host devices 110 by the CMTS 200. The probe message 650 is an example Neighbor Solicitation (NS) probe message sent to the host devices 110 by the CMTS 200. The ARP and NS probe messages include fields to indicate which host device the probe message is being sent to and where the host device is to respond to the ARP probe message.

Figure 7:
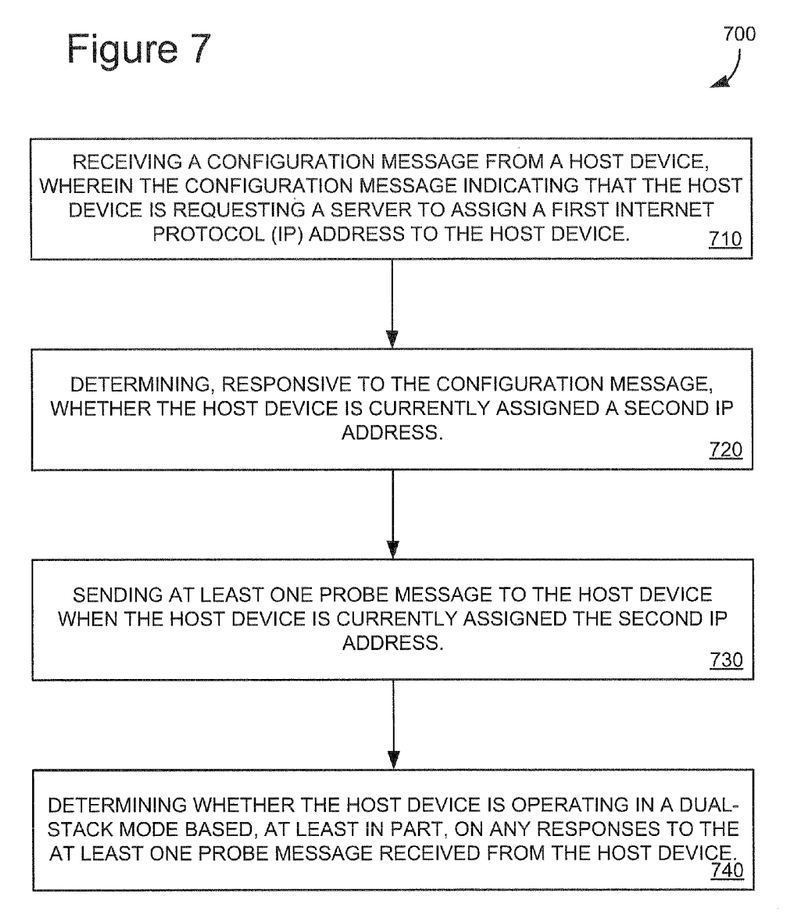
FIG. 7 shows example flowchart embodiments for the detection and support of dual-stack host devices.

FIG. 7 shows example flowchart embodiments for the detection and support of dual-stack host devices 110. Referring to FIG. 7, in a block 710, the CMTS 200 is configured to receive a configuration message from a host device. The configuration message indicates to the computing system that the host device is requesting a server to assign a first Internet Protocol (IP) address to the host device.

When the configuration message is a DHCPDISCOVER message, the host device is attempting to locate a DHCP server 150 to request an IPv4 address. When the configuration message is a SOLICIT message, the host device is attempting to locate a DHCP server 150 to request an IPv6 address.

In a block 720, the CMTS 200 is configured to determine, responsive to the configuration message, whether the host device is currently assigned a second IP address. In some embodiments, the CMTS 200 includes a database 230 that stores IP addresses that have previously assigned to the host device. Upon receipt of the configuration message, the CMTS 200 can look-up IP addresses that are currently assigned to the host device. In some embodiments, the CMTS 200 attempts to locate an IP address version that is different than the one associated with the configuration message. For instance, when the CMTS 200 receives a DHCPDISCOVER message, the CMTS 200 will attempt to determine whether the host device has previously been assigned an IPv6 address. When the CMTS 200 receives a SOLICIT message, the CMTS 200 will attempt to determine whether the host device has previously been assigned an IPv4 address.

In a block 730, the CMTS 200 is configured to send at least one probe message to the host device when the host device is currently assigned the second IP address. This probe message can elicit a response from the host device when the host device still intends on utilizing the second IP address.

In some embodiments, when the second IP address is an IPv4 address, the CMTS 200 can send unicast ARP probe messages to the host device. When the second IP address is an IPv6 address, the CMTS 200 can send unicast NS probe messages to the host device.

In a block 740, the CMTS 200 is configured to determine whether the host device is operating in a dual-stack mode based, at least in part, on any responses to the at least one probe message received from the host device. The CMTS 200 can detect the operational state of the host device, e.g., a no IP address state, an IPv4 single-stack state, an IPv6 single-stack state, or a dual-stack state, based on whether the host device responds to the probe messages. The CMTS 200 can also determine the operational state of the host device by snooping the configuration messaging passed between the host device and the DHCP server 150 in combination with the use of the probe messages.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
    a host interface to receive configuration messaging from a host device assigned a first Internet Protocol (IP) address according to a first IP version, wherein the configuration messaging requests a dynamic host configuration protocol (DHCP) server assign a second IP address to the host device, the second IP address having a second IP version different from the first IP version; and
    a controller to forward the configuration messaging to the DHCP server, generate and send at least one probe message to the host device through the host interface responsive to receiving the configuration messaging and subsequent to the forwarding of the configuration messaging, and determine whether the host device is operating in one of a state where the first IP address remains utilized by the host device in addition to the second IP address assigned by the DHCP server to the host device, or a second state where the first IP address is no longer utilized by the host device, the determining of the state based, at least in part, on any response to the at least one probe message received from the host device, and the determining whether the host device is operating in the second state based on a determined absence of any response to the at least one probe message and independent of any DHCP release message or any timeout without renewal;
    the controller further configured for deleting, in response to the determining the host device is operating in the second state, the first IP address from a database entry associating the first IP address and the second IP address to the host device.

2. The device of claim 1, further comprising a server interface to transmit the configuration messaging to the DHCP server.

3. The device of claim 2, wherein the controller determines whether the host device is operating in the state of a dual-stack mode with both the first IP address and the second IP address assigned to the host device based, at least in part, on any response to the at least one probe message received from the host device and a reply from the DHCP server in response to the configuration messaging from the host device.

4. The device of claim 1, wherein the controller sends the at least one probe message to the host device through the host interface based on the host device being previously assigned an IP address and the configuration messaging indicating the host device is requesting another IP address.

5. The device of claim 1, wherein the second IP address requested in the configuration messaging is an Internet Protocol-version 4 (IPv4) address, and the first IP address is an Internet Protocol-version 6 (IPv6) address.

6. The device of claim 5, wherein the at least one probe message is a unicast Neighbor Solicitation message that is configured to detect whether the host device will continue to respond to network traffic directed to the IPv6 address that was previously assigned to the host device.

7. The device of claim 1, wherein the second IP address requested in the configuration messaging is an Internet Protocol-version 6 (IPv6) address, and the first IP address is an Internet Protocol-version 4 (IPv4) address.

8. The device of claim 7, wherein the at least one probe message is a unicast Address Resolution Protocol (ARP) message to detect whether the host device will continue to respond to network traffic directed to the IPv4 address that was previously assigned to the host device.

9. A method comprising:
forwarding configuration messaging from a host device to a dynamic host configuration protocol (DHCP) server with a network processing device, wherein the configuration messaging is configured to request the DHCP server assign an Internet Protocol (IP) address according to a first IP version to the host device;
generating and sending at least one probe message to the host device with the network processing device, responsive to receiving the configuration messaging and subsequent to the forwarding of the configuration messaging;
determining, with the network processing device, whether the host device is operating in one of a state where the host device continues to utilize a previously assigned IP address in addition to the IP address requested by the configuration messaging, or a second state where the previously assigned IP address is no longer utilized by the host device, the previously assigned IP address having a second IP version different from the first IP version, the determining of the state based, at least in part, on any responses to the at least one probe message received from the host device, and the determining whether the host device is operating in the second state based on a determined absence of any response to the at least one probe message and independent of any DHCP release message or any timeout without renewal; and
deleting, in response to the determining the host device is operating in the second state, the previously assigned IP address from a database entry associating the IP address and the previously assigned IP address to the host device.

10. The method of claim 9 further comprises receiving a reply message from the DHCP server and forwarding the reply message to the host device with a network processing device, wherein the network processing device determines whether the host device is operating in the state of a dual-stack mode based on the reply message received from the DHCP server and the response to the at least one probe message from the host device.

11. The method of claim 9, further comprising tracking, with the network processing device, whether the host device is in the state of any one of a single-stack configuration supporting an Internet Protocol-version 4 (IPv4) address or an Internet Protocol-version 6 (IPv6) address, or in a dual-stack configuration supporting both the IPv4 and IPv6 addresses.

12. The method of claim 9, wherein the IP address requested in the configuration messaging is an Internet Protocol-version 4 (IPv4) address, and the previously assigned IP address is an Internet Protocol-version 6 (IPv6) address.

13. The method of claim 12, wherein the at least one probe message is a Internet Control Message Protocol-version 6 (ICMPv6) message to detect whether the determined state of the host device will cause the host device to continue to respond to network traffic directed to the IPv6 address that was previously assigned to the host device.

14. The method of claim 9, wherein the IP address requested in the configuration messaging is an Internet Protocol-version 6 (IPv6) address, and the previously assigned IP address is an Internet Protocol-version 4 (IPv4) address.

15. The method of claim 14, wherein the at least one probe message is a Internet Control Message Protocol-version 4 (ICMPv4) message to detect whether the determined state of the host device will cause the host device to continue to respond to network traffic directed to the IPv4 address that was previously assigned to the host device.

16. An apparatus including a computer-readable memory storing instructions, that when executed by a computing system, cause the computing system to:
forward, at a controller, a configuration message from a host device to a dynamic host configuration protocol (DHCP) server, wherein the configuration message indicating to the computing system that the host device is requesting the DHCP server to assign a first Internet Protocol (IP) address according to a first IP version to the host device;
determine, responsive to the configuration message, whether the host device was previously assigned a second IP address having a second IP version different from the first IP version;
generate and send, at the controller, at least one probe message to the host device responsive to the configuration message and subsequent to the forwarding of the configuration messaging; and
determine whether the host device is operating in one of a state where the host device continues to utilize the second IP address in addition to the first IP address requested by the host device from the DHCP server, or a second state where the second IP address is no longer utilized by the host device, the determining of the state being based, at least in part, on any response to the at least one probe message received from the host device, and the determining whether the host device is operating in the second state based on a determined absence of any response to the at least one probe message and independent of any DHCP release message or any timeout without renewal; and
delete, in response to the determining the host device is operating in the second state, the second IP address from a database entry associating the first IP address and the second IP address to the host device.

17. The apparatus of claim 16, wherein the computing system determines the host device is operating in the state of a dual-stack mode with both the first IP address and the second IP address assigned to the host device based on the computing system receiving a response to the at least one probe message and the server assigning the first IP address to the host device.

18. The apparatus of claim 16, wherein the computing system determines the host device is not operating in the state of a dual-stack mode based on the computing system not receiving a response to the at least one probe message.

19. The apparatus of claim 16, wherein the computing system sends at least one Neighbor Solicitation probe to the host device based on the second IP address being an Internet Protocol-version 6 (IPv6) address.

20. The apparatus of claim 16, wherein the computing system sends at least one Address Resolution Protocol (ARP) probes to the host device based on the second IP address being an Internet Protocol-version 4 (IPv4) address.

* * * * *